United States Patent
Chen

(10) Patent No.: US 11,678,157 B2
(45) Date of Patent: *Jun. 13, 2023

(54) SMART LANDMARK

(71) Applicant: Beijing Voyager Technology Co., Ltd., Beijing (CN)

(72) Inventor: Qi Chen, Burlingame, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 324 days.

This patent is subject to a terminal disclaimer.

(21) Appl. No.: 17/149,356

(22) Filed: Jan. 14, 2021

(65) Prior Publication Data

US 2021/0136581 A1 May 6, 2021

Related U.S. Application Data

(63) Continuation of application No. 16/036,845, filed on Jul. 16, 2018, now Pat. No. 10,966,089.

(51) Int. Cl.
*H04W 4/44* (2018.01)
*H04W 12/08* (2021.01)
*G06K 7/10* (2006.01)
*H04W 4/40* (2018.01)
*H04W 4/02* (2018.01)
(Continued)

(52) U.S. Cl.
CPC ......... *H04W 4/44* (2018.02); *G06K 7/10712* (2013.01); *G06V 20/56* (2022.01); *H04W 4/02* (2013.01); *H04W 4/40* (2018.02); *H04W 12/08* (2013.01); *H04W 12/63* (2021.01)

(58) Field of Classification Search
CPC ......... H04W 4/44; H04W 4/02; H04W 12/63; H04W 12/08; H04W 4/40

USPC ....................................................... 380/270
See application file for complete search history.

(56) References Cited

U.S. PATENT DOCUMENTS 8,078,349 B1 * 12/2011 Prada Gomez ...... G05D 1/0061
701/1
10,075,452 B2 * 9/2018 Badro .................. H04N 21/812
(Continued)

FOREIGN PATENT DOCUMENTS

CN 104596525 A 5/2015
CN 104748754 A 7/2015
(Continued)

OTHER PUBLICATIONS

PCT International Search Report and the Written Opinion dated Apr. 10, 2019, issued in related International Application No. PCT/US2018/068073 (11 pages).

*Primary Examiner* — Teshome Hailu
(74) *Attorney, Agent, or Firm* — Sheppard Mullin Richter & Hampton LLP

(57) ABSTRACT

Systems and methods are provided for smart-landmark-based positioning. Such methods may include detecting, using a sensor mounted on a vehicle, a landmark object, obtaining landmark information of the detected landmark object, the landmark information including identification of the landmark object and an encrypted location of the landmark object, transmitting, from the vehicle over a wireless network, a query including at least part of the obtained landmark information, receiving, by the vehicle over the wireless network, a query response including additional information of the landmark.

16 Claims, 8 Drawing Sheets

(51) Int. Cl.
*H04W 12/63* (2021.01)
*G06V 20/56* (2022.01)

(56) References Cited

U.S. PATENT DOCUMENTS

| | | | | |
|---|---|---|---|---|
| 2008/0242374 | A1* | 10/2008 | Alexander | H04W 64/00 455/575.1 |
| 2009/0103722 | A1* | 4/2009 | Anderson | H04L 9/0841 713/171 |
| 2011/0112969 | A1* | 5/2011 | Zaid | H04W 4/027 701/2 |
| 2014/0358331 | A1* | 12/2014 | Prada Gomez | B60W 60/0051 701/2 |
| 2015/0356306 | A1* | 12/2015 | Carter | G06F 21/64 380/246 |
| 2017/0032381 | A1* | 2/2017 | Vaidyanathan | G06Q 30/0185 |

FOREIGN PATENT DOCUMENTS

| | | |
|---|---|---|
| DE | 102013101493 A1 | 8/2014 |
| KR | 10-2007-0042599 A1 | 4/2007 |

\* cited by examiner

SMART LANDMARK

CROSS REFERENCE TO RELATED APPLICATION

This application is a continuation of U.S. patent application Ser. No. 16/036,845, filed on Jul. 16, 2018, the contents of which are hereby incorporated by reference in the entirety.

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

This disclosure generally relates to methods and systems for positioning based on smart landmarks.

BACKGROUND

Obtaining detailed positioning information (e.g., ground truth) of landmark objects such as street lamps, traffic lights, and trees, is useful in knowing exact locations of the landmark objects and/or a user such as a vehicle running proximate to the landmark objects. Conventionally, a user is able to obtain detailed positioning information of landmark objects from a land survey company on the basis of a subscription contract with the land survey company. However, even if a user wants to know detailed positioning information of a landmark object, it may be difficult for the user to specify the landmark object, including its features and its location, so that the land survey company can identify the landmark object. For example, when a user wants to know detailed positioning information of one of a plurality of street lamps along a street, the user may not precisely specify which street lamp the user refers to and what position of the street lamp (at a ground level or a top level) the user refers to. Moreover, locations of landmark objects and relative positions thereof to other landmark objects may be changed for various reasons including damages on the landmark objects, move and/or removal of the landmark objects, and addition of new landmark objects. For those reasons, it is desired to provide detailed positioning information of landmark objects to users in a more efficient and more precise manner.

SUMMARY

Various embodiments of the present disclosure can include systems, methods, and non-transitory computer readable media for smart-landmark-based positioning. A method for smart-landmark-based positioning may include receiving sensor data of a landmark object collected by one or more sensors installed on a vehicle; obtaining on-site landmark information of the landmark object by parsing the sensor data of the landmark object, wherein the on-site landmark information comprises a landmark ID and a location of the landmark object; generating a query request based on the on-site landmark information of the landmark object and sending the query request to a server over a wireless network; receiving, from the server over the wireless network, a ground truth of the landmark object corresponding to the landmark ID and the location of the landmark object, the ground truth including a registered location of the landmark object; determining whether at least part of information in the ground truth matches at least part of the on-site landmark information of the landmark object; and in response to determining that the at least part of information in the ground truth matches the at least part of the on-site landmark information of the landmark object, operating the vehicle based on the registered location of the landmark object in the ground truth.

In some embodiments, the method may further comprise sending a cryptographic key unique to the vehicle with the query request to the server over the wireless network.

In some embodiments, the location of the landmark object is encrypted using a private cryptographic key unique to the landmark object.

In some embodiments, the ground truth further comprises a decrypted location of the landmark object decrypted using a public cryptographic key unique to the landmark object.

In some embodiments, the method may further comprise triggering maintenance and/or survey of the landmark object by generating and sending an error feedback to a location service server in response to determining that the information in the ground truth mismatches the on-site landmark information of the landmark object.

In some embodiments, the operating the vehicle comprises generating a high-definition map of an area around the vehicle based on the ground truth of the landmark object.

In some embodiments, the operating the vehicle based on the registered location of the landmark object in the ground truth comprises: calibrating a location of the vehicle in a satellite-based navigation system of the vehicle based on the ground truth.

In some embodiments, calibrating the location of the vehicle in the satellite-based navigation system of the vehicle comprises: determining a global positioning system (GPS) location of the landmark object based on a current location of the vehicle using a GPS of the vehicle and a relative position of the vehicle to the landmark object; determining a location difference between the GPS location of the landmark object and the registered location in the ground truth of the landmark object; and calibrating the GPS of the vehicle based on the determined location difference.

Another method for smart-landmark-based positioning may include registering, with respect to each of a plurality of landmark, a landmark object record including identification, a location, additional information, and a cryptographic key of the landmark object in repository, receiving, from a vehicle over a wireless network, a query including identification and an encrypted location of a target landmark object, and in response to the query: i) obtaining a cryptographic key unique to the target landmark object from the repository; ii) decrypting the encrypted location of the target landmark object using the obtained cryptographic key unique to the target landmark object; iii) obtaining additional information of the target landmark object from the repository; and iv) upon decrypting the encrypted location of the target landmark object, transmitting a query response including the obtained additional information of the target landmark object to the vehicle over the wireless network.

In some embodiments, the cryptographic key unique to the target landmark object is a first cryptographic key unique to the target landmark object, and the encrypted location of a target landmark object is encrypted using a second cryptographic key unique to the target landmark object. In some embodiments, the first cryptographic key is a public key unique to the target landmark object and the second cryptographic key is a private key of the target landmark object corresponding to the private key unique to the target landmark object.

In some embodiments, the query also includes identification of the vehicle, and the method further comprises, upon decrypting the encrypted location of the target landmark object, encrypting at least part of the query response using a cryptographic key unique to the vehicle, such that the query response at least part of which is encrypted is transmitted to the vehicle.

In some embodiments, the another method further includes, before each of the plurality of landmark objects is installed, assigning, with respect to each of the plurality of landmark objects, the identification and the cryptographic key, and carrying out on-site survey of one of the plurality of landmark objects to which the identification and the cryptographic key are assigned, to determine additional information of the one of the plurality of landmark objects, wherein the additional information of the one of the plurality of landmark objects is registered in the repository after the on-site survey.

In some embodiments, the another method further includes, with respect to one of the plurality of landmark objects, updating additional information thereof registered in the repository to new additional information. In some embodiments, the another method further includes generating additional information history of the one of the plurality of landmark objects using the additional information thereof that has been registered and the new additional information.

In some embodiments, the repository includes a plurality of sub-repositories located at different geographical locations, each of the sub-repositories storing one or more landmark object records of one or more landmark objects located at the corresponding geographical location.

In some embodiments, the additional information includes ground truth of the landmark object.

In some embodiments, a system includes a landmark registration server and a location service server configured to perform one or more of the above another method.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Various embodiments of the present disclosure include systems, methods, and non-transitory computer readable media for smart-landmark-based positioning, which can be suitably applied to autonomous driving of vehicles, are described.

According to various embodiments of the present disclosure, when a smart-landmark-based vehicle operation is carried out, a sensor mounted on a vehicle detects a landmark object, and landmark information of the detected landmark object, which includes identification of the landmark object and an encrypted location of the landmark object, is obtained. Thereafter, a query including at least part of the obtained landmark information is transmitted from the vehicle over a wireless network, and then a query response including a ground truth of the landmark object is received by the vehicle over the wireless network. The vehicle is operated based on the ground truth of the landmark object. Also, to enable the smart-landmark-based vehicle operation, with respect to each of a plurality of landmark objects, a landmark object record including identification, a location, a ground truth, and a cryptographic key of the landmark object is registered in repository. When a location service server receives, from a vehicle over a wireless network, a query including identification and an encrypted location of a target landmark object, the location service server obtains a cryptographic key unique to the target landmark object from the repository, and decrypts the encrypted location of the target landmark object using the obtained cryptographic key unique to the target landmark object. Also, the location service server obtains a ground truth of the target landmark object from the repository, and, upon decrypting the encrypted location of the target landmark object, transmits a query response including the obtained ground truth of the target landmark object to the vehicle over the wireless network.

Figure 1:
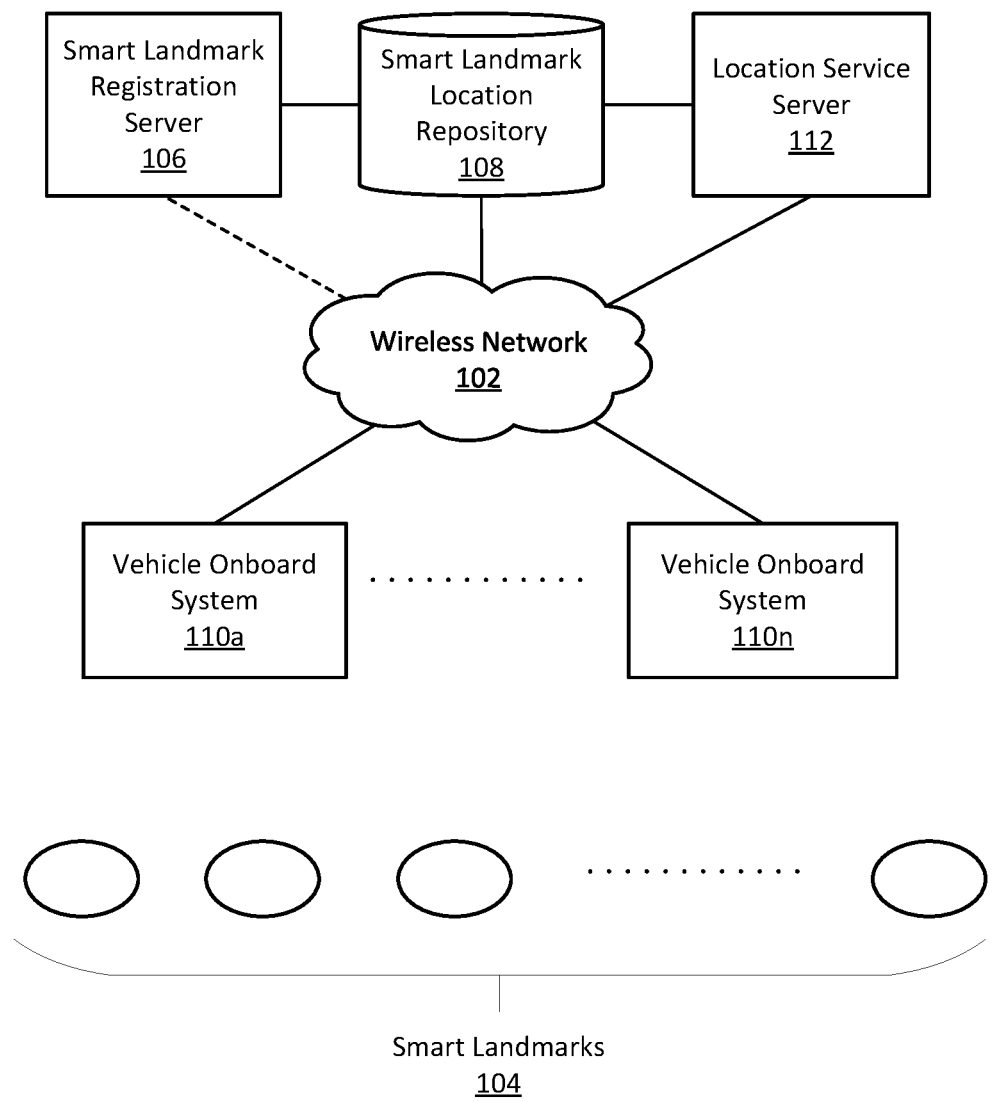
FIG. 1 illustrates an example of a system architecture of a smart-landmark-based positioning system according to some embodiments.

FIG. 1 illustrates an example of a system architecture 100 of a smart-landmark-based positioning system according to some embodiments. In the example of FIG. 1, the system architecture 100 includes a network 102, a plurality of smart landmarks 104, a smart landmark registration server 106, a smart landmark location repository 108, one or more vehicle onboard systems 110a-110n (hereinafter collectively referred to as "vehicle onboard system"), and a location service server 112.

In the example of the system architecture 100 shown in FIG. 1, the network 102a is intended to represent a computer network of wireless communication or a combination of wired and wireless communications. In some embodiments, the network 102 includes any one or more of, for instance, an intranet, a LAN (Local Area Network), a PAN (Personal Area Network), a SAN (Storage Area Network), and/or other network. In some embodiments, the network 102 includes any one or more of, for instance, the Internet, a WAN (Wide Area Network, a MAN (Metropolitan Area Network), a cellular communications network, a Public Switched Telephone Network, and/or other network. In some embodiments, the wireless communication includes one or more of long-range wireless communication based on GSM, W-CDMA and/or CDMA2000 (3G), IEEE 802. 16 (e.g., WiMAX, 4G LTE, etc.), IEEE 802. 11 (e.g., WiFi, 5G), and so on.

In the example of the system architecture 100 shown in FIG. 1, the smart landmarks 104 are intended to represent landmarks having functionality to indicate on-site smart landmark information, such as registered identification thereof and location thereof. In a specific implementation, the smart landmarks 104 is road infrastructure, and includes one or more of a street light, a traffic signal, a street tree, a traffic sign, a pavement, a sidewalk curb, a wall of a parking structure, a wall of a tunnel, and so on. In a specific implementation, a smart landmark 104 is configured indicate on-site smart landmark information and other information of the smart landmark 104 using a code symbol (e.g., QR code) that is optically recognizable using optical sensors, such as an image sensor. In a specific implementation, a smart landmark 104 is configured indicate on-site smart landmark information and other information of the smart landmark 104 by transmitting a wireless signal (e.g., beacon signal) including the on-site smart landmark information from a signal transmitter including an antenna. Depending on a specific implementation and other consideration, a smart landmark 104 may be configured with an existing object coupled with a structure (e.g., code symbol and/or signal transmitter) to indicate the on-site smart landmark information (hereinafter referred to as "landmark information indicator"), or a specifically-manufactured object having the structure. For example, the smart landmark 104 can be a pole, a building, a street sign, a tree, or any other object that is coupled with a code symbol and/or signal transmitter. In some embodiments, the landmark information indicator may not be necessarily installed on the smart landmark structure, but can be installed on other structure that is within certain proximity of the smart landmark structure. For example, if a smart landmark structure is a building, the landmark information indicator (code symbol and/or signal transmitter) may be placed on a tree or pole close to the smart landmark structure. Information on the building can be obtained from the landmark information indicator. In a specific implementation, when a landmark information indicator is placed at a portion of a larger object as a smart landmark 104, a location of the smart landmark 104 is assumed to be represented by a location of the landmark information indicator.

In a specific implementation, the landmark information indicator has applicable size (e.g., 2'×2') and color or color pattern (e.g., checker flag pattern) to be more accurately recognized by an optical sensor, when the on-site smart landmark information is optically recognized. In another specific implementation, the landmark information indicator has an applicable signal strength for the on-site smart landmark information to reach vehicle onboard systems. In a specific implementation, the landmark information indicator is placed at an applicable altitude (height) to be accurately recognized by an optical sensor or have its signal to be accurately recognized by a signal receiver. In a specific implementation, an exterior of a landmark information indicator is formed of an applicable material for being placed outdoor, such as metal, glass, and synthetic organic materials.

In the example of the system architecture 100 shown in FIG. 1, the smart landmark registration server 106 are intended to represent hardware configured to register a smart landmark record of a smart landmark 104 to be installed, in the smart landmark location repository 108. Depending on a specific implementation and other consideration, the smart landmark registration server 106 may or may not be coupled to the network 102. For example, when the smart landmark registration server 106 is not connected to the network 102, a smart landmark record can be generated based on data locally input by users and stored in the smart landmark location repository 108 through a local connection. In another example, when the smart landmark registration server 106 is connected to the network 102, a smart landmark record can be generated based on data remotely input and stored in the smart landmark location repository 108 through the network 102.

In a specific implementation, a smart landmark record of a smart landmark 104 includes one or more of a smart landmark ID, a location (a planned location), and a cryptographic key of a smart landmark 104 before the smart landmark 104 is installed at a location, and includes also additional information such as detailed positioning information (e.g., a ground truth) of the smart landmark 104 after the smart landmark 104 has been installed at a location. In a specific implementation, a smart landmark ID of a smart landmark 104 is a value unique to the smart landmark 104. In a specific implementation, a location of a smart landmark 104 is on a street light, a traffic signal, a street tree, a traffic sign, a pavement, a sidewalk curb, a wall of a parking structure, a wall of a tunnel, and so on. In a specific implementation, a cryptographic key of a smart landmark 104 is a symmetric key or a pair of asymmetric keys (i.e., public key and private key) unique to the smart landmark 104. In some embodiments, the additional information may include other information about the smart landmark, for example, the time it was made, the time it was installed, last maintenance time, functionalities, size or dimensions, damages, other operational information, and any other information that may be useful for driving and maintenance purposes. In some embodiments, the additional information may include map information of and around the smart landmark, which may be provided by third parties such as map providers, like Google map, Baidu map, etc. In a specific implementation, a ground truth of a smart landmark 104 is an actual location of the smart landmark on earth (including an latitude, a longitude, and an altitude).

In the example of the network architecture 100 shown in FIG. 1, the smart landmark location repository 108 are intended to represent a specifically purposed datastore configured to store a smart landmark record generated by the smart landmark registration server 106. In a specific implementation, the smart landmark location repository 108 forms a smart landmark database therein, which includes a plurality of entries for a plurality of smart landmarks, respectively. In a specific implementation, one entry of the smart landmark database corresponds to a smart landmark record of a smart landmark, and includes values of a smart landmark ID, a location, a cryptographic key, and detailed positioning information (e.g., a ground truth).

In the example of the network architecture 100 shown in FIG. 1, the vehicle onboard system 110 is intended to represent a hardware configured to obtain detailed positioning information (e.g., a ground truth) of a smart landmark and operates a vehicle based on the obtained detailed positioning information. In a specific implementation, to obtain detailed positioning information (e.g., a ground truth) of a smart landmark, the vehicle onboard system 110 obtains on-site smart landmark information including a smart landmark ID and an encrypted location of the smart landmark from a smart landmark 104, generates and sends a query including the smart landmark ID and the encrypted location of the smart landmark to the location service server 112, and receives a query response including the detailed positioning information from the location service server 112. Depending on a specific implementation and other consideration, a vehicle onboard system 110 is integrated with or coupled to a vehicle control system to control operation of a vehicle. An operation carried out based on detailed positioning information (e.g., a ground truth) of a smart landmark may include one or more of an autonomous driving of a vehicle, a calibration of a global positioning system (GPS) of or connected to a vehicle, generation of a high-definition (HD) map, and so on.

In the example of the network architecture 100 shown in FIG. 1, the location service server 112 is intended to represent a hardware configured to retrieve a smart landmark record of a smart landmark from the smart landmark location repository 108, in response to a query from the vehicle onboard system 110, generate a query response based on the retrieved smart landmark record, and return the query response to the vehicle onboard system. In a specific implementation, in order to achieve a secure communication with a vehicle onboard system 110, the location service server 112 performs encrypted communication.

As is understood by skilled artisans in the relevant computer and Internet-related arts, each functional component (e.g., server, system, or repository) illustrated in FIG. 1 may be implemented using hardware (e.g., a processor of a machine) or a combination of logic (e.g., executable software instructions) and hardware (e.g., memory and processor of a machine) for executing the logic. Furthermore, the various functional components depicted in FIG. 1 may reside on a single machine (e.g., a server) or may be distributed across several machines in various arrangements such as cloud-based architectures. Moreover, any two or more of these components may be combined into a single component (e.g., a single module), and the functions described herein for a single component may be subdivided among multiple engines. Specific hardware structure of the functional components illustrated in FIG. 1 is exemplified with reference to FIG. 8. In a specific implementation, the smart landmark registration sever 106, the smart landmark location repository 108, and/or the location service server 112 includes a plurality of sub-servers and/or sub-repositories located at different geographical locations. For example, each of the sub-repositories stores one or more smart landmark records of one or more smart landmarks located at the corresponding geographical location, such that a propagation delay of communication with a vehicle onboard system 110 can be minimized.

In an example of operation of the example system shown in FIG. 1, the smart landmark registration server 106 registers a smart landmark record including a smart landmark ID, a location, a cryptographic key, and detailed positioning information (e.g., a ground truth) of a smart landmark that has been installed at a site, in the smart landmark location repository 108. In an example of operation of the example system shown in FIG. 1, the vehicle onboard system 110, on a vehicle running on a street, detects the smart landmark, obtains on-site smart landmark information, and transmits a query for detailed positioning information (e.g., a ground truth) of the smart landmark using the on-site smart landmark information. In an example of operation of the example system shown in FIG. 1, the location service server 112 receives the query from the vehicle onboard system 110, generates a query response including the detailed positioning information (e.g., the ground truth) of the smart landmark, and transmits the query response to the vehicle onboard system 110. In an example of operation of the example system shown in FIG. 1, the vehicle onboard system 110 receives the query response including the detailed positioning information (e.g., ground truth) of the smart landmark and operates the vehicle based on the detailed positioning information of the smart landmark.

Figure 2:
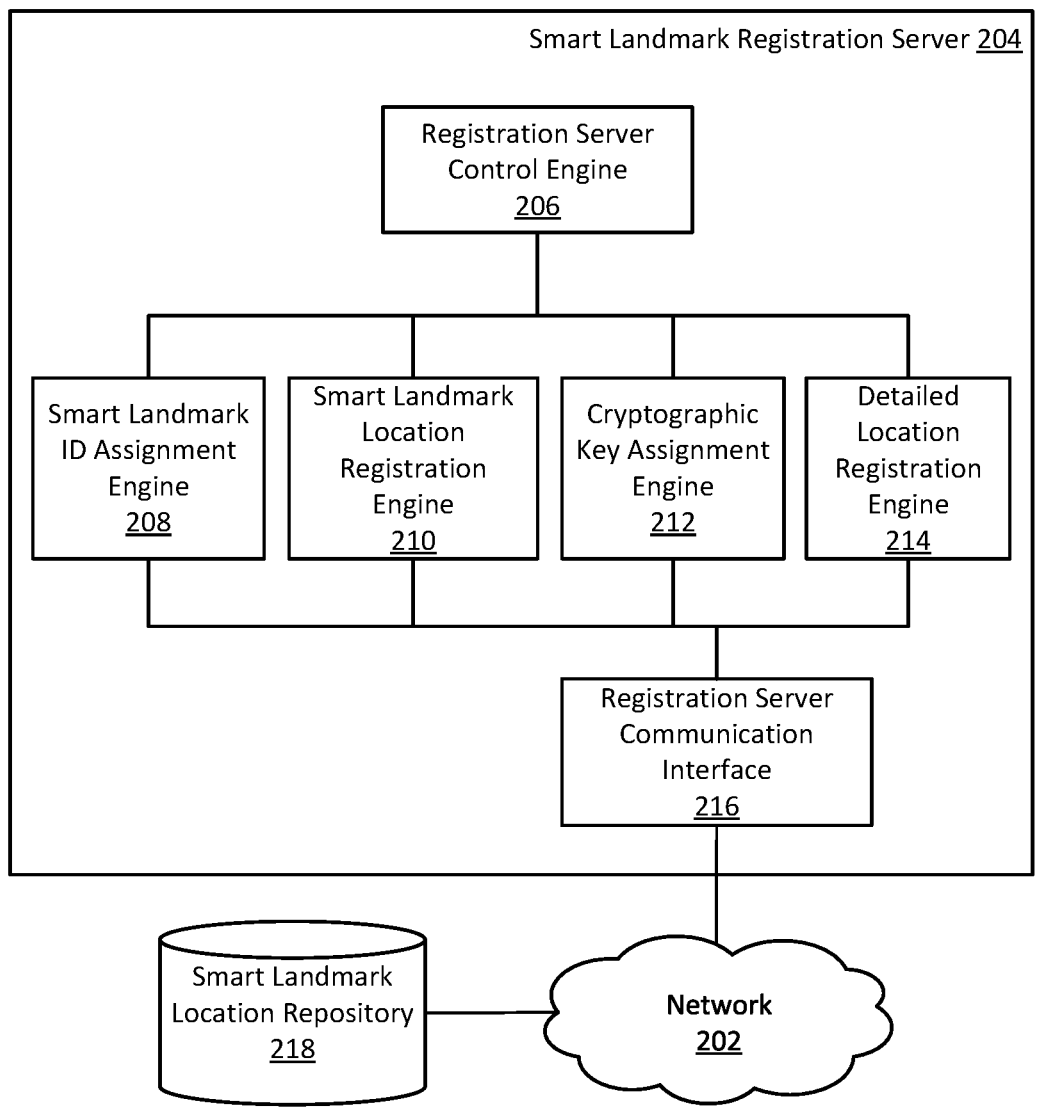
FIG. 2 illustrates an example of a detailed system architecture around a smart landmark registration server of a smart-landmark-based positioning system according to some embodiments.

FIG. 2 illustrates an example of a detailed system architecture 200 around a smart landmark registration server of a smart-landmark-based positioning system according to some embodiments. In the example of FIG. 2, the detailed system architecture 200 includes a smart landmark registration server 204 and a smart landmark location repository 218 coupled to each other through a wireless network 202. In a specific implementation, the network 202, the smart landmark registration server 204, and the smart landmark location repository 218 correspond to the network 102, the smart landmark registration server 106, and the smart landmark location repository 108 in FIG. 1, respectively.

In the example depicted in FIG. 2, the smart landmark registration server 204 is intended to represent a hardware configured to register a smart landmark. In a specific implementation, in registering a smart landmark, the smart landmark registration server 204 generates a smart landmark record of the smart landmark before the smart landmark is installed, and registers a smart landmark ID, a location to be installed, and a cryptographic key unique to the smart landmark in the smart landmark record. In a specific implementation, in registering a smart landmark, the smart landmark registration server 204 registers detailed positioning information (e.g., a ground truth) of the smart landmark after the smart landmark has been installed. The smart landmark registration server 204 includes a registration server control engine 206, a smart landmark ID assignment engine 208, a smart landmark location registration engine 210, a cryptographic key assignment engine 212, a detailed location registration engine 214, and a registration server communication interface 216.

In the example depicted in FIG. 2, the smart landmark location repository 218 is intended to represent a specifically purposed datastore configured to store a smart landmark record generated by the smart landmark registration server 204. In a specific implementation, the smart landmark location repository 218 forms a smart landmark database therein, which includes a plurality of entries for a plurality of smart landmarks, respectively. In a specific implementation, one entry of the smart landmark database corresponds to a smart landmark record of a smart landmark, and includes values of a smart landmark ID, a location (e.g. GPS location), a cryptographic key, and detailed positioning information (e.g., ground truth).

In a specific implementation, the smart landmark location repository 218 or repository of the smart landmark registration server 204 forms a vehicle onboard system database including a plurality of entries, each of which includes identification of a vehicle (or a vehicle onboard system), a cryptographic key unique to the identification, and so on.

In the example depicted in FIG. 2, the registration server control engine 206 of the smart landmark registration server 204 is intended to represent specifically purposed hardware and software configured to control overall operation of the smart landmark registration server 204. In the example depicted in FIG. 2, the registration server control engine 206 is configured to carry out operations based on an application instruction stored in a non-transitory computer readable medium, which is for example stored in datastore of the smart landmark registration server 204. In a specific implementation, the registration server control engine 206 is configured to cause the registration server communication interface 216 to transmit data to and/or receive data from the smart landmark location repository 218.

In the example depicted in FIG. 2, the smart landmark ID assignment engine 208 of the smart landmark registration server 204 is intended to represent specifically purposed hardware and software configured to generate a smart landmark record for a smart landmark to be installed and assign a smart landmark ID to the smart landmark to be installed. A smart landmark ID is a value unique to a smart landmark. In a specific implementation, once a smart landmark ID is assigned to a smart landmark, the smart landmark ID is included in a smart landmark record for the smart landmark.

In the example depicted in FIG. 2, the smart landmark location registration engine 210 of the smart landmark registration server 204 is intended to represent specifically purposed hardware and software configured to register a location of a smart landmark to be installed in a smart landmark record thereof. In a specific implementation, a location of a smart landmark to be installed is determined by an applicable entity, such as a local authority, a map service provider, an autonomous driving information service provider, and so on. For example, the location of the smart landmark may be on a street light, a traffic signal, a street tree, a traffic sign, a pavement, a sidewalk curb, a wall of a parking structure, a wall of a tunnel, and so on. Depending on a specific implementation and other consideration, a location of a smart landmark may include less precise location information than detailed positioning information (e.g., ground truth) of a smart landmark. For example, a location of a smart landmark is indicated by one or more of a zip code, a state, a city name, a street name, a location of street, a building name, a floor number, an estimated GPS location (e.g., latitude and longitude), and so on. Depending on a specific implementation and other consideration, the smart landmark location registration engine 210 may update a registered location of a smart landmark to an actual installed location of the smart landmark if the actual installed location is different from a planned location thereof.

In the example depicted in FIG. 2, the cryptographic key assignment engine 212 of the smart landmark registration server 204 is intended to represent specifically purposed hardware and software configured to assign a cryptographic key unique to a smart landmark to be installed to the smart landmark. In a specific implementation, the cryptographic key is a symmetric key or a pair of asymmetric keys (i.e., public key and private key). In a specific implementation, the cryptographic key assignment engine 212 encrypts a location of the smart landmark using the cryptographic key. For example, when the cryptographic key is a symmetric key, the cryptographic key assignment engine 212 encrypts a location of a smart landmark using the symmetric key, and the encrypted location of the smart landmark can be decrypted using the same symmetric key. In another example, when the cryptographic key is an asymmetric key pair, the cryptographic key assignment engine 212 encrypts a location of a smart landmark using a private key, and the encrypted location of the smart landmark can be decrypted using the public key corresponding to the private key. In a specific implementation, when the cryptographic key assignment engine 212 generates an encrypted location of a smart landmark, the smart landmark location registration engine 210 registers the encrypted location in a corresponding smart landmark record. In a specific implementation, a smart landmark ID and an encrypted location of a smart landmark are presented by the smart landmark, for example using a code symbol, or transmitted from the smart landmark, after the smart landmark is installed.

In the example depicted in FIG. 2, the detailed location registration engine 214 of the smart landmark registration server 204 is intended to represent specifically purposed hardware and software configured to register detailed positioning information (e.g., ground truth) of a smart landmark in the corresponding smart landmark record. In a specific implementation, in registering detailed positioning information (e.g., ground truth) of a smart landmark, the detailed location registration engine 214 obtains the detailed positioning information of the smart landmark from a result of an on-site survey of the smart landmark, after the smart landmark has been installed at a location. In a specific implementation, an on-site survey of a smart landmark is carried out by an applicable entity such as a local authority, a map service provider, an autonomous driving information service provider, and so on. Depending on a specific implementation and other consideration, detailed positioning information of a smart landmark includes more precise location information than a location of the smart landmark. For example, detailed positioning information (e.g., ground truth) of a smart landmark is an actual location of the smart landmark on earth (including a latitude, a longitude, and an altitude), and may be indicated by more digits than a GPS location (e.g., a latitude and a longitude). Depending on a specific implementation and other consideration, the detailed location registration engine 214 may update registered detailed positioning information (e.g., ground truth) of a smart landmark to updated detailed positioning information (e.g., ground truth) of the smart landmark if updated detailed positioning information of a smart landmark obtained through an on-site survey provides different updated detailed positioning information. For example, an update of a registered ground truth may occur when a smart landmark is moved, altered, damaged, removed, and so on. In a specific implementation, the detailed location registration engine 214 may generate updated detailed positioning information history of a smart landmark when an update of updated detailed positioning information occurs and register the generated detailed positioning information history in a corresponding smart landmark record.

In the example depicted in FIG. 2, the registration server communication interface 216 of the smart landmark registration server 204 is intended to represent specifically purposed hardware and software configured to transmit data for registration to the smart landmark location repository 218 for registration therein. In a specific implementation, when a smart landmark record and/or data to be included therein (e.g., ground truth) is generated, the registration server communication interface 216 is caused to transmit the generated smart landmark record and/or the data to be included therein (e.g., ground truth) to the smart landmark location repository 218 for storage therein and receive acknowledgement of registration.

As is understood by skilled artisans in the relevant computer and Internet-related arts, each functional component (e.g., engine, module, or repository) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single machine (e.g., a server) or may be distributed across several machines in various arrangements such as cloud-based architectures. Moreover, any two or more of these components may be combined into a single component (e.g., a single module), and the functions described herein for a single component may be subdivided among multiple engines. Specific hardware structure of the functional components illustrated in FIG. 2 is exemplified with reference to FIG. 8.

In an example of operation of the example system shown in FIG. 2, the registration server control engine 206 controls the overall operation of the smart landmark registration server 204. In the example of operation of the example system shown in FIG. 2, the smart landmark ID assignment engine 208 generates a smart landmark record for a smart landmark to be installed and assigns a smart landmark ID to the smart landmark to be installed. Further, in the example of operation of the example system shown in FIG. 2, the smart landmark location registration engine 210 registers a location of the smart landmark to be installed. In the example of operation of the example system shown in FIG. 2, the cryptographic key assignment engine 212 assigns a cryptographic key to the smart landmark to be installed and generates an encrypted location of the smart landmark, such that the smart landmark, which includes the smart landmark ID and the encrypted location, is installed on the location. In the example of operation of the example system shown in FIG. 2, the detailed location registration engine 214 registers detailed positioning information history of the smart landmark, which is obtained as a result of an on-site survey of the smart landmark installed at the location, in the corresponding smart landmark record. In the example of operation of the example system shown in FIG. 2, the registration server communication engine 216 transmits data for registration to the smart landmark location repository 218 for registration therein.

Figure 3:
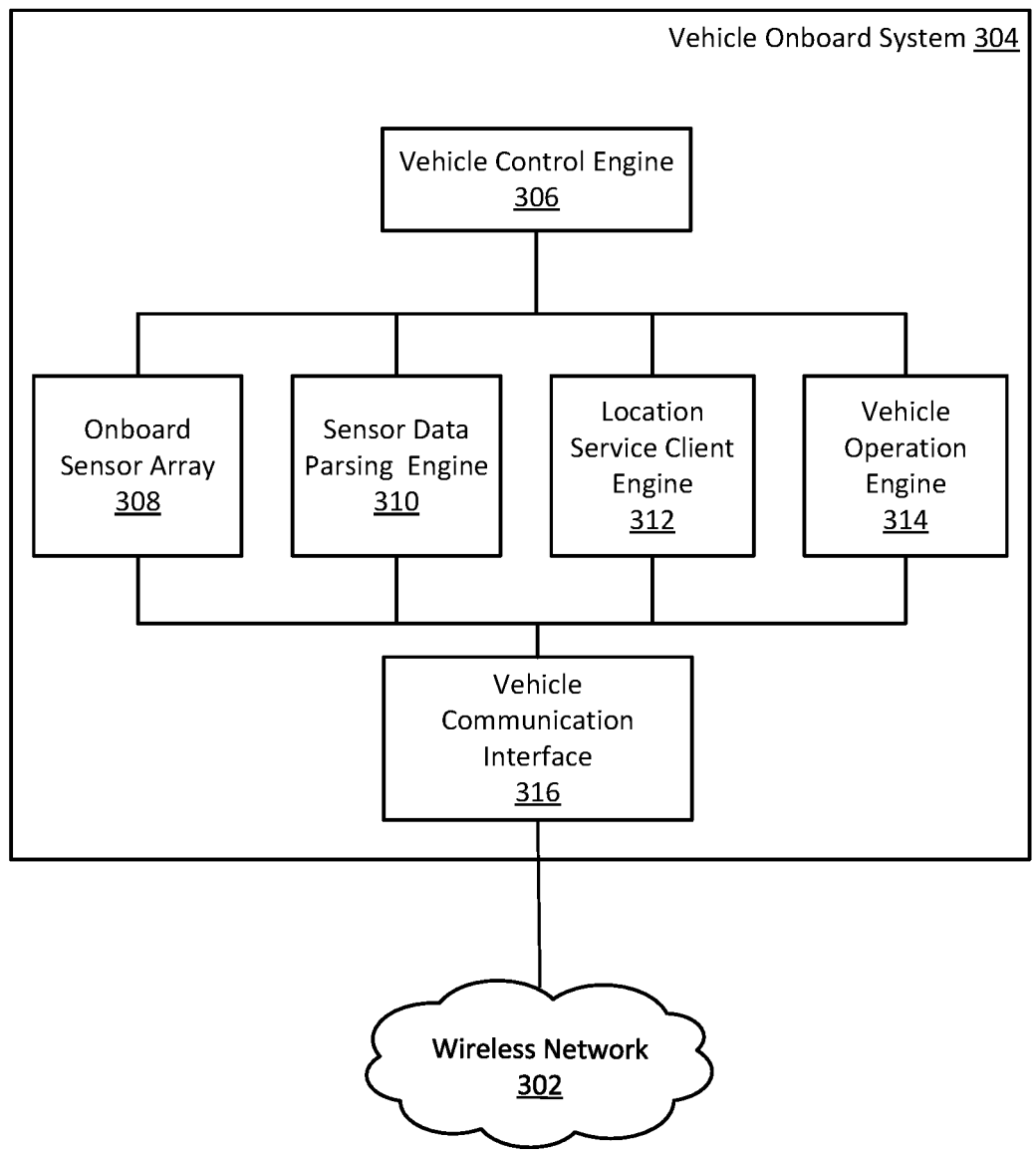
FIG. 3 illustrates an example of a detailed system architecture around a vehicle onboard system of a smart-landmark-based positioning system according to some embodiments.

FIG. 3 illustrates an example of a detailed system architecture 300 around a vehicle onboard system of a smart-landmark-based positioning system according to some embodiments. The detailed system architecture 300 includes a vehicle onboard system 304 coupled to a wireless network 302. In a specific implementation, the wireless network 302 and the vehicle onboard system 304 correspond to the network 102 and the vehicle onboard system 110 in FIG. 1, respectively.

In the example depicted in FIG. 3, the vehicle onboard system 304 is intended to represent a hardware configured to obtain detailed positioning information history of a smart landmark and operates a vehicle based on the obtained detailed positioning information. Depending on a specific implementation and other consideration, the vehicle onboard system 304 is integrated with or coupled to a vehicle control system to control operation of a vehicle. The vehicle onboard system 304 includes a vehicle control engine 306, an onboard sensor array 308, a sensor data parsing engine 310, a location service client engine 312, a vehicle operation engine 314, and a vehicle communication interface 316.

In the example depicted in FIG. 3, the vehicle control engine 306 of the vehicle onboard system 304 is intended to represent specifically purposed hardware and software configured to control overall operation of the vehicle onboard system 304. In the example depicted in FIG. 3, the vehicle control engine 306 is configured to carry out operations based on an application instruction stored in a non-transitory computer readable medium, which is for example stored in datastore of the vehicle control engine 306. In a specific implementation, the vehicle control engine 306 is configured to cause the vehicle communication interface 316 to transmit data to and/or receive data through the wireless network 302.

In the example depicted in FIG. 3, the onboard sensor array 308 of the vehicle onboard system 304 is intended to represent specifically purposed hardware and software configured to sense vehicle environment for operation of a vehicle. In a specific implementation, the onboard sensor array 308 includes a plurality of types of sensors, including two or more of image sensors, beacon signal sensors, acceleration sensors, gyro sensors, GPS sensors, and so on. Further, the onboard sensor array 308 may include a plurality of sensors for a sensor type. For example, the onboard sensor array 308 includes a front image sensor, a rear image sensor, and side image sensors on both sides of a vehicle. Depending on a specific implementation and other consideration, when the onboard sensor array 308 includes one or more image sensors, the one or more image sensors may be configured to detect a smart landmark based on a captured image thereby. For example, when a smart landmark includes an object of a unique shape or color, an image sensor may detect the smart landmark based on the object of the unique shape or color included in a captured image. In another example, when a smart landmark includes a code symbol (e.g., QR code) unique to a smart landmark, an image sensor may detect the smart landmark based on the code symbol included in a captured image. Depending on a specific implementation and other consideration, when the onboard sensor array 308 includes one or more beacon signal sensors (e.g., antenna), the one or more beacon signal sensors may be configured to detect a smart landmark based on a beacon signal transmitted from the smart landmark. Depending on a specific implementation and other consideration, when the onboard sensor array 308 includes one or more GPS sensors, the one or more GPS sensors may be configured to locate a position of a vehicle, based on which the vehicle is navigated.

In the example depicted in FIG. 3, the sensor data parsing engine 310 of the vehicle onboard system 304 is intended to represent specifically purposed hardware and software configured to obtain on-site smart landmark information from a detected smart landmark. In a specific implementation, when an image of a code symbol is obtained, the sensor data parsing engine 310 parses image data of the image of the code symbol, and obtains on-site smart landmark information from the code symbol. In a specific implementation, when a beacon signal from a smart landmark is obtained, the sensor data parsing engine 310 processes the beacon signal to obtain on-site smart landmark information therefrom. Depending on a specific implementation and other consideration, on-site smart landmark information may include a smart landmark ID and an encrypted location of a smart landmark, which is, for example, encrypted using a private key of the smart landmark by an applicable system such as the smart landmark registration sever 204 in FIG. 2. In another implementation, on-site smart landmark information may include an encrypted smart landmark ID and a location of a smart landmark.

In the example depicted in FIG. 3, the location service client engine 312 of the vehicle onboard system 304 is intended to represent specifically purposed hardware and software configured to generate a query for detailed positioning information of a smart landmark and cause the generated query to be transmitted to a location service server through the vehicle communication interface 316. In a specific implementation, a query includes an identification (e.g., MAC address, etc.) of the vehicle onboard system and/or a vehicle (e.g., VIN, registration number, etc.), which is here collectively referred to as identification of a vehicle. In a specific implementation, a query includes at least part of on-site smart landmark information obtained by the sensor data parsing engine 310, such as a smart landmark ID and an encrypted location of a smart landmark. Encryption of at least one unit of data included in a query may enable a location service server to authenticate the query. In a specific implementation, the query may further include an estimated location of the smart landmark, which may be generated based on data obtained by the onboard GPS and map.

The location service client engine 312 of the vehicle onboard system 304 is also configured to receive a query response transmitted in response to a query for detailed positioning information of a smart landmark through the vehicle communication interface 316. In a specific implementation, a query response includes one or more of a smart landmark ID, a non-encrypted (e.g., decrypted) location, and detailed positioning information of a smart landmark. In a specific implementation, when information included in the query response mismatches local information (e.g., obtained from the onboard sensor array 308), the location service client engine 312 may generate an error feedback and cause the vehicle communication interface 316 to transmit the error feedback to an applicable destination, such as a location service server. A location service server that receives an error feedback may prompt maintenance and/or survey of a relevant smart landmark.

In the example depicted in FIG. 3, the vehicle operation engine 314 of the vehicle onboard system 304 is intended to represent specifically purposed hardware and software configured to operate a vehicle based on a received query response, for example, detailed positioning information included therein. In a specific implementation, the vehicle operation engine 314 carries out an autonomous control of a locomotive system of the vehicle. For example, the vehicle operation engine 314 causes the vehicle to move to and stop at a specific location determined based on detailed positioning information of a smart landmark. This smart-landmark-based operation of a vehicle is useful at locations out of a signal range of a GPS system, such as an indoor and/or underground parking structure, a tunnel, under severe weather conditions, and so on. In a specific implementation, the vehicle operation engine 314 carries out calibration of a global positioning system (GPS) mounted on or connected to the vehicle. For example, the vehicle operation engine 314 may determine a GPS location of a smart landmark based on a current location of a vehicle determined based on a GPS mounted thereon and a relative position of the vehicle to a smart landmark, and then calibrate a GPS positioning based on a difference between the GPS location and detailed positioning information of the smart landmark. In a specific implementation, the vehicle operation engine 314 generates and present a precise high-definition map of an area around a vehicle based on detailed positioning information of a smart landmark.

In the example depicted in FIG. 3, the vehicle communication interface 316 of the vehicle onboard system 304 is intended to represent specifically purposed hardware and software configured to transmit and receive data through the wireless network 302. In a specific implementation, when a query for a smart landmark is generated, the vehicle communication interface 316 is caused to transmit the generated query to a location service server through the wireless network 302. In a specific implementation, after a query is transmitted, the vehicle communication interface 316 is caused to receive a query response from a location service server through the wireless network 302.

As is understood by skilled artisans in the relevant computer and Internet-related arts, each functional component (e.g., engine, module, or repository) illustrated in FIG. 3 may be implemented using hardware (e.g., a processor of a machine) or a combination of logic (e.g., executable software instructions) and hardware (e.g., memory and processor of a machine) for executing the logic. Furthermore, the various functional components depicted in FIG. 3 may reside on a single machine (e.g., a server) or may be distributed across several machines in various arrangements such as cloud-based architectures. Moreover, any two or more of these components may be combined into a single component (e.g., a single module), and the functions described herein for a single component may be subdivided among multiple engines. Specific hardware structure of the functional components illustrated in FIG. 3 is exemplified with reference to FIG. 8.

In an example of operation of the example system shown in FIG. 3, the vehicle control engine 306 controls the overall operation of the vehicle onboard system 304. In the example of operation of the example system shown in FIG. 3, the onboard sensor array 308 detects a smart landmark installed around a vehicle, which may be running on a street. Further, in the example of operation of the example system shown in FIG. 3, the sensor data parsing engine 310 obtains on-site smart landmark information of the detected smart landmark. In the example of operation of the example system shown in FIG. 3, the location service client engine 312 generates a query for detailed positioning information of the smart landmark and causes the generated query to be transmitted to a location service server. In the example of operation of the example system shown in FIG. 3, the location service client engine 312 also receives a query response transmitted from the location service server in response to the query. In the example of operation of the example system shown in FIG. 3, the vehicle operation engine 314 operates the vehicle based on the received query response, for example, detailed positioning information included therein. In the example of operation of the example system shown in FIG. 3, the vehicle communication interface 316 is controlled to transmit data to and receive data from the location service server.

Figure 4:
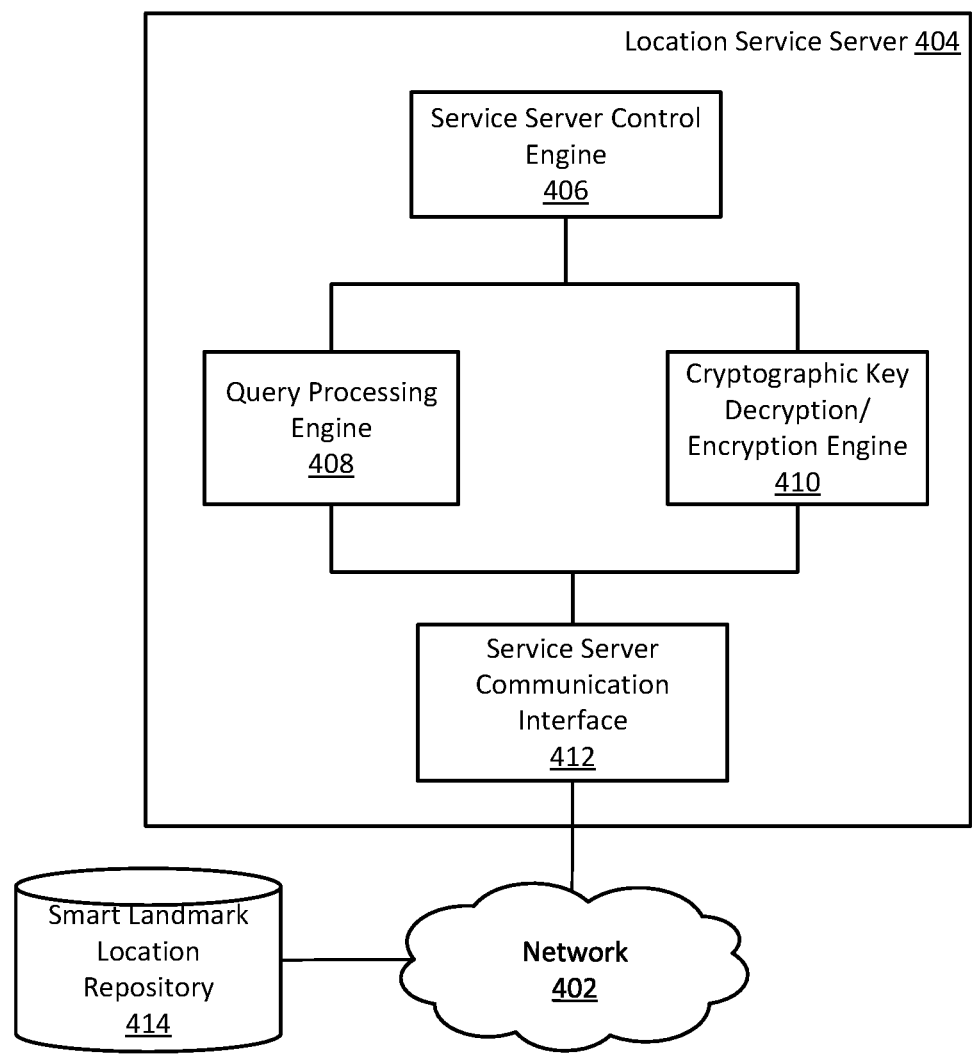
FIG. 4 illustrates an example of a detailed system architecture around a location service server of a smart-landmark-based positioning system according to some embodiments.

FIG. 4 illustrates an example of a detailed system architecture 400 around a location service server of a smart-landmark-based positioning system according to some embodiments. The detailed system architecture 400 includes a location service server 404 and a smart landmark location repository 414 coupled to each other through a network 402. In a specific implementation, the network 402 and the location service server 404 correspond to the network 102 and the location service server 112 in FIG. 1, respectively.

In the example depicted in FIG. 4, the location service server 404 is intended to represent a hardware configured to retrieve a smart landmark record of a smart landmark from the smart landmark location repository 414, in response to a query from a vehicle onboard system, generate a query response based on the retrieved smart landmark record, and return the query response to the vehicle onboard system. The location service server 404 includes a service server control engine 406, a query processing engine 408, a cryptographic key decryption/encryption engine 410, and a service server communication interface 412. In the example depicted in FIG. 4, the smart landmark location repository 414 is intended to represent a specifically purposed datastore configured to store a smart landmark record generated by a smart landmark registration server (e.g., the smart landmark registration server 204 in FIG. 2).

In the example depicted in FIG. 4, the service server control engine 406 of the location service server 404 is intended to represent specifically purposed hardware and software configured to control overall operation of the location service server 404. In the example depicted in FIG. 4, the service server control engine 406 is configured to carry out operations based on an application instruction stored in a non-transitory computer readable medium, which is for example stored in datastore of the location service server 404. In a specific implementation, the service server control engine 406 is configured to cause the service server communication interface 412 to transmit data to and/or receive data from the smart landmark location repository 414 and transmit data to and/or receive data from a vehicle onboard system.

In the example depicted in FIG. 4, the query processing engine 408 is intended to represent specifically purposed hardware and software configured to obtain, from the smart landmark location repository 414, a smart landmark record of a smart landmark identified by a smart landmark ID included in a query that is received from a vehicle onboard system through the service server communication interface 412. In a specific implementation, the query processing engine 408 transmits a smart landmark ID in a query to the smart landmark location repository 414 as a search key, and the smart landmark location repository 414 returns a smart landmark record that matches the search key to the query processing engine 408. In a specific implementation, a smart landmark record received from the smart landmark location repository 414 includes a smart landmark ID matching the smart landmark ID as the search key, a registered location, a cryptographic key (e.g., asymmetric key pair, a public key, etc.), detailed positioning information, and so on.

The query processing engine 408 is configured to authenticate the received query. In a specific implementation, in order to authenticate the received query, the query processing engine 408 causes the cryptographic key decryption/encryption engine 410 to decrypt an encrypted location of a smart landmark included in a query using a cryptographic key in the smart landmark record from the smart landmark location repository 414. In a specific implementation, when the decrypted location of the smart landmark matches the registered location in the obtained smart landmark record, the query processing engine 408 determines that authentication of the query is successful. In a specific implementation, upon successful authentication of a query, the query processing engine 408 generates a query response, which includes, for example, the smart landmark ID, a non-encrypted (e.g., decrypted) location, and detailed positioning information of a smart landmark.

In the example depicted in FIG. 4, the cryptographic key decryption/encryption engine 410 is intended to represent specifically purposed hardware and software configured to perform encryption and/or decryption with respect to a query, a query response, and/or data included therein. In a specific implementation, the cryptographic key decryption/encryption engine 410 decrypts an encrypted location of a smart landmark included in a query received from a vehicle onboard system. In a specific implementation, the cryptographic key decryption/encryption engine 410 encrypts a query response and/or part thereof (e.g., ground truth), using a cryptographic key (e.g., symmetric or asymmetric) unique to an identification of a vehicle, such that only a corresponding vehicle onboard system can obtain information in the query response.

In the example depicted in FIG. 4, the service server communication interface 412 of the location service server 404 is intended to represent specifically purposed hardware and software configured to transmit data to and from the smart landmark location repository 414 and to and from a vehicle onboard system.

In a specific implementation, when a query is received from a vehicle onboard system, the service server communication interface 412 is caused to transmit a search key to the landmark location repository 414 and receive a smart landmark record from the landmark location repository 414. In a specific implementation, when a query response is generated, the service server communication interface 412 is caused to transmit the generated query response to a vehicle onboard system from which the query has been received.

As is understood by skilled artisans in the relevant computer and Internet-related arts, each functional component (e.g., engine, module, or repository) illustrated in FIG. 4 may be implemented using hardware (e.g., a processor of a machine) or a combination of logic (e.g., executable software instructions) and hardware (e.g., memory and processor of a machine) for executing the logic. Furthermore, the various functional components depicted in FIG. 4 may reside on a single machine (e.g., a server) or may be distributed across several machines in various arrangements such as cloud-based architectures. Moreover, any two or more of these components may be combined into a single component (e.g., a single module), and the functions described herein for a single component may be subdivided among multiple engines. Specific hardware structure of the functional components illustrated in FIG. 4 is exemplified with reference to FIG. 8.

In an example of operation of the example system shown in FIG. 4, the service server control engine 406 controls the overall operation of the location service server 404. In the example of operation of the example system shown in FIG. 4, the query processing engine 408 receives a query for a smart landmark through the service server communication interface 412 from a vehicle onboard system, and processes the received query. In the example of operation of the example system shown in FIG. 4, the query processing engine 408 authenticates the received query, obtains detailed positioning information of the smart landmark upon successful authentication of the query, and generates a query response. Further, in the example of operation of the example system shown in FIG. 4, in order to authenticate the received query, the cryptographic key decryption/encryption engine 410 decrypts an encrypted registered location of the smart landmark included in the query. In the example of operation of the example system shown in FIG. 4, the service server communication interface 412 receives the query from the vehicle onboard system, and transmits the query response to the vehicle onboard system.

Figure 5:
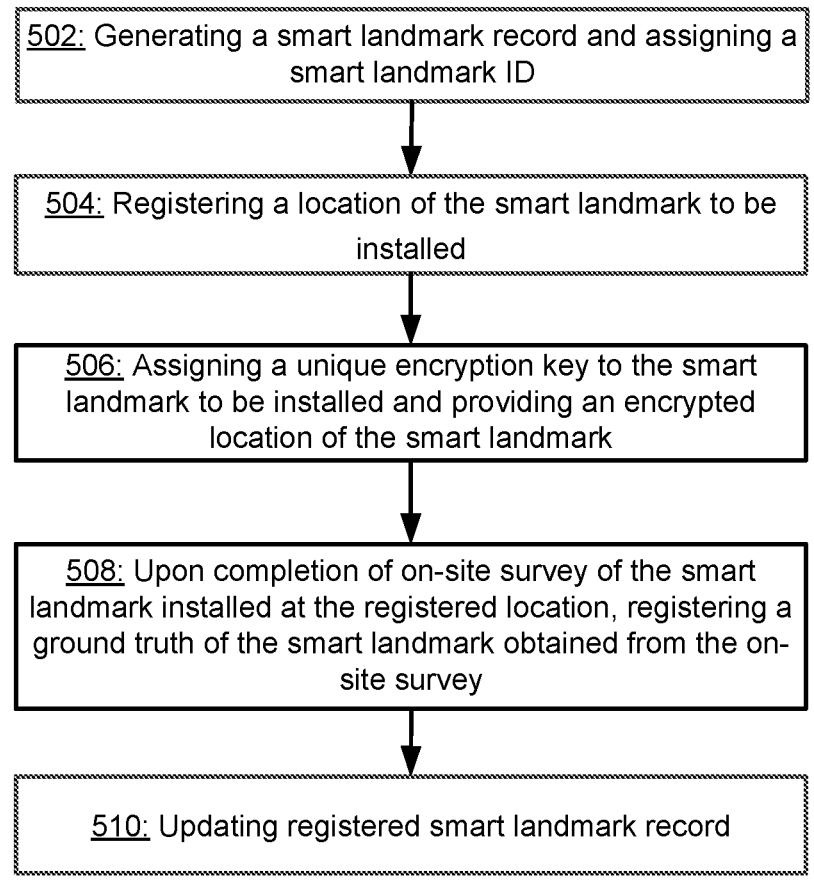
FIG. 5 illustrates a flowchart of an example method for registering a smart landmark according to some embodiments.

FIG. 5 illustrates a flowchart of an exemplary method 500 for registering a smart landmark according to some embodiments. This flowchart illustrates modules (and potentially decision points) organized in a fashion that is conducive to understanding. It should be recognized, however, that the modules can be reorganized for parallel execution, reordered, modified (changed, removed, or augmented), where circumstances permit. The exemplary method 500 may be implemented in various environments including, for example, the smart landmark registration server 106 of FIG. 1 and/or the smart landmark registration server 204 of FIG. 2. The exemplary method 500 may be implemented by multiple systems similar to the smart landmark registration server. The operations of the exemplary method 500 presented below are intended to be illustrative.

In step 502 of FIG. 5, a smart landmark record for a smart landmark is generated and a smart landmark ID is assigned to the smart landmark. An applicable engine for generating a smart landmark record, such as the smart landmark ID assignment engine 208 in FIG. 2, generates the smart landmark record for the smart landmark, and an applicable engine for assigning a smart landmark ID, such as the smart landmark ID assignment engine 208 in FIG. 2, assigns the smart landmark ID is assigned to the smart landmark. In a specific implementation, the generated smart landmark record is stored as an entry in a smart landmark database generated in an applicable repository, such as the smart landmark location repository 218 in FIG. 2, and the assigned smart landmark ID is input in the entry.

In step 504 of FIG. 5, a location of the smart landmark to be installed is registered in a smart landmark record. An applicable engine for generating a smart landmark record, such as the smart landmark location registration engine 210 in FIG. 2, registers the location of the smart landmark in the smart landmark record, by causing an applicable module such as the registration server communication interface 216 in FIG. 2 to store the location of the smart landmark in an applicable repository, such as the smart landmark location repository 218 in FIG. 2. In a specific implementation, the location of the smart landmark to be installed is input in the corresponding entry in the smart landmark database.

In step 506 of FIG. 5, a cryptographic key unique to the smart landmark to be installed is assigned and an encrypted location of the smart landmark that is encrypted using the cryptographic key is registered in the smart landmark record. An applicable engine for assigning cryptographic key unique to a smart landmark, such as the cryptographic key assignment engine 212 in FIG. 2, assigns the cryptographic key unique to the smart landmark to be installed. An applicable engine for registering an encrypted location of the smart landmark, such as the smart landmark location registration engine 210 in FIG. 2, registers the encrypted location of the smart landmark to be installed in the smart landmark record thereof, by causing an applicable module such as the registration server communication interface 216 in FIG. 2 to store the encrypted location of the smart landmark in an applicable repository, such as the smart landmark location repository 218 in FIG. 2. In a specific implementation, the cryptographic key unique to the smart landmark and the encrypted location of the smart landmark are input in the corresponding entry in the smart landmark database.

In step 508 of FIG. 5, upon completion of on-site survey of the smart landmark installed at the registered location, detailed positioning information of the smart landmark obtained from the on-site survey is registered. An applicable engine for registering detailed positioning information of a smart landmark, such as the detailed location registration engine 214 in FIG. 2, registers the detailed positioning information of the smart landmark installed at the registered location, by causing an applicable module such as the registration server communication interface 216 in FIG. 2 to store the detailed positioning information of the smart landmark in an applicable repository, such as the smart landmark location repository 218 in FIG. 2. In a specific implementation, the detailed positioning information of the smart landmark is input in the corresponding entry in the smart landmark database.

Figure 6:
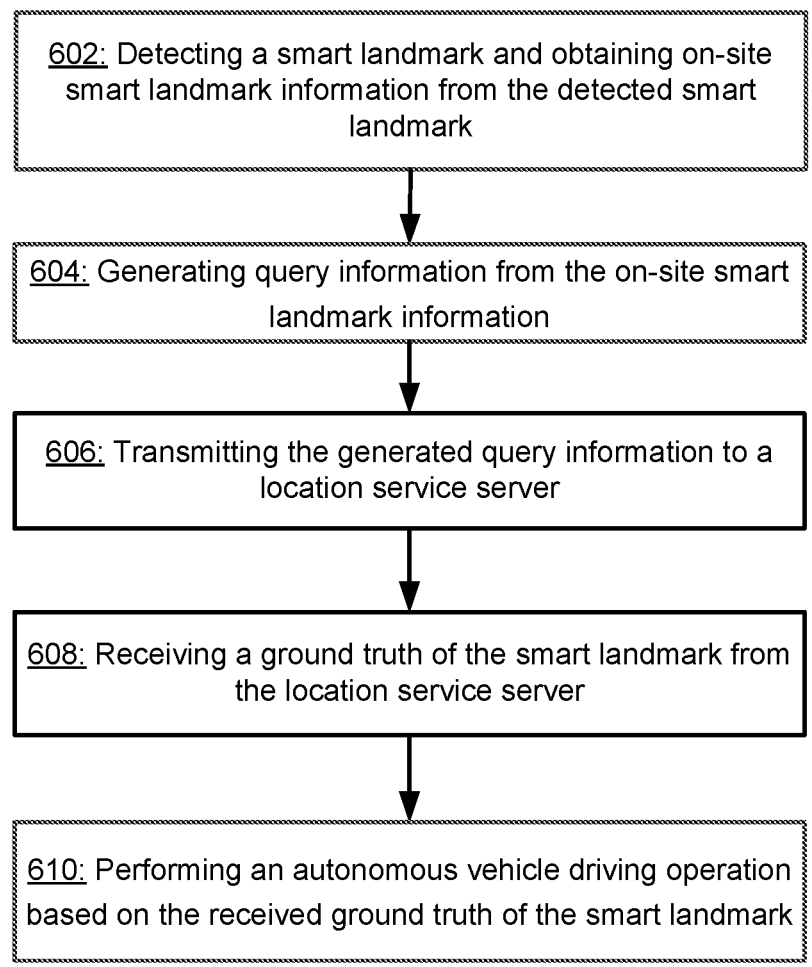
FIG. 6 illustrates a flowchart of an example method for obtaining a ground truth of a smart landmark according to some embodiments.

FIG. 6 illustrates a flowchart of an exemplary method 600 for obtaining detailed positioning information of a smart landmark according to some embodiments. The exemplary method 600 may be implemented in various environments including, for example, the vehicle onboard system 110 of FIG. 1 and/or the vehicle onboard system 304 of FIG. 3. The exemplary method 600 may be implemented by multiple systems similar to the vehicle onboard system. The operations of the exemplary method 600 presented below are intended to be illustrative.

In step 602 of FIG. 6, a smart landmark is detected and on-site smart landmark information is obtained from the detected smart landmark. An applicable module for detecting a smart landmark, such as the onboard sensor array 308 in FIG. 3 detects the smart landmark, and an applicable engine for obtaining on-site smart landmark information, such as the sensor data parsing engine 310 in FIG. 3, obtains the on-site smart landmark information from the detected smart landmark. In a specific implementation, the smart landmark is detected by performing an image recognition operation on an image captured by an image sensor using an image recognition algorithm, and the on-site smart landmark information is obtained by parsing an image of the detected smart landmark. In a specific implementation, the on-site smart landmark information includes identification of the smart landmark and an encrypted location of the smart landmark.

In step 604 of FIG. 6, a query for detailed positioning information of the smart landmark is generated using the on-site smart landmark information of the smart landmark. An applicable module for generating a query for detailed positioning information of a smart landmark, such as the location service client engine 312 in FIG. 3 generating the query for the detailed positioning information of the smart landmark. In a specific implementation, the generated query includes identification of the smart landmark and an encrypted location of the smart landmark included in on-site smart landmark information. In a specific implementation, the generated query may further include an estimated location of the smart landmark, which is generated by the vehicle based on GPS and/or map.

In step 606 of FIG. 6, the generated query is transmitted to a location service server over a wireless network. An applicable module for transmitting a query for detailed positioning information of a smart landmark, such as the vehicle communication interface 316 in FIG. 3, is caused to transmit the query for the detailed positioning information of the smart landmark to the location service server over the wireless network.

In step 608 of FIG. 6, a query response including the requested detailed positioning information of the smart landmark is received from the location service server over a wireless network. An applicable module for receiving a query response, such as the vehicle communication interface 316 in FIG. 3, is configured to receive the query response including the requested detailed positioning information of the smart landmark from the location service server over the wireless network. In some embodiments, the query response may include map information of and/or around the smart landmark provided by map providers, such as Google, Baidu, etc.

In step 610 of FIG. 6, the vehicle is operated based on the received detailed positioning information (i.e., the received ground truth) of the smart landmark. An applicable module for operating a vehicle, such as the vehicle operation engine 314 in FIG. 3, operates the vehicle based on the received detailed positioning information of the smart landmark. In a specific implementation, a locomotive system of the vehicle is autonomously operated based on the received detailed positioning information of the smart landmark. In a specific implementation, a global positioning system (GPS) of or connected to the vehicle is calibrated based on a position of the smart landmark determined from the detailed positioning information thereof and a position of the smart landmark determined from the GPS. For example, position of the smart landmark determined from the GPS may be different from the ground truth. The GPS position can be aligned to the ground truth. This will help improve localization in autonomous driving.

Figure 7:
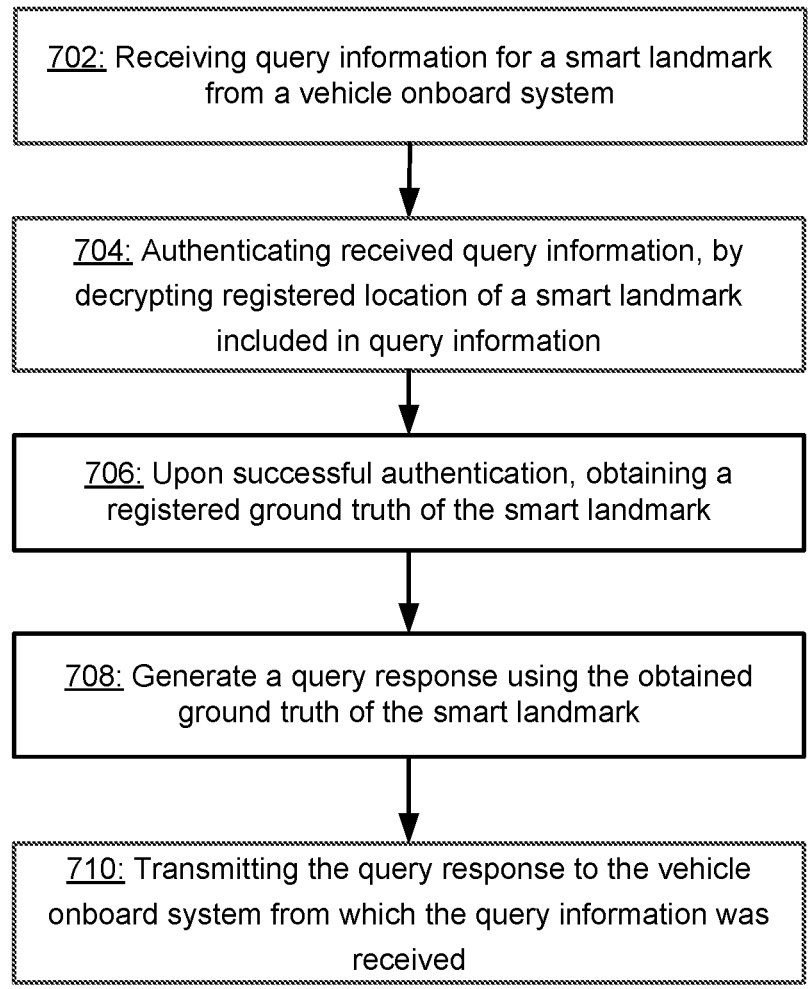
FIG. 7 illustrates a flowchart of an example method for providing a ground truth of a smart landmark according to some embodiments.

FIG. 7 illustrates a flowchart of an exemplary method 700 for providing a detailed positioning information of a smart landmark according to some embodiments. The exemplary method 700 may be implemented in various environments including, for example, the location service server 112 of FIG. 1 and/or the location service server 404 of FIG. 4. The exemplary method 700 may be implemented by multiple systems similar to the location service server. The operations of the exemplary method 700 presented below are intended to be illustrative. In a specific implementation, the query includes identification of the smart landmark and an encrypted location of the smart landmark.

In step 702 of FIG. 7, a query for a smart landmark is received from a vehicle onboard system. An applicable module for receiving a query, such as the query processing engine 408 in FIG. 4, receives the query for the smart landmark from the location service server, through an applicable interface such as the service server communication interface 412 in FIG. 4. In a specific implementation, the received query includes identification of the smart landmark and an encrypted location of the smart landmark. In a specific implementation, the received query may further include an estimated location of the smart landmark, which is generated by an applicable system such as the vehicle onboard system as discussed above.

In step 704 of FIG. 7, the received query is authenticated, by decrypting an encrypted registered location of a smart landmark included in the query. An applicable module for authenticating a query, such as the query processing engine 408 in FIG. 4, authenticates the query by causing an applicable engine, such as the cryptographic key decryption/encryption engine 410 in FIG. 4, to decrypt the encrypted registered location of the smart landmark included in the query. In a specific implementation, when the encrypted location of the smart landmark is successfully decrypted, and a pair of the identification of the smart landmark and the decrypted location thereof matches those included in a smart landmark record of the smart landmark in a smart landmark location repository, it is determined that the authentication of the query is successful. In a specific implementation, when a received query includes an estimated location of the smart landmark, the authentication of the query may also include matching of the decrypted location and the estimated location of the smart landmark. When these two locations are within a certain range (e.g., 3-5 meters), the matching may be determined as successful. If the two locations are not within the certain range, the server may determine that the smart landmark has been moved, and send an alert to the vehicle. In another embodiment, the server may match the estimated location with the ground truth of the smart landmark. When these two locations are within a certain range (e.g., 3-5 meters), the matching may be determined as successful. If the two locations are not within the certain range, the server may determine that the smart landmark has been moved, and send an alert to the vehicle.

In step 706 of FIG. 7, upon successful authentication, registered detailed positioning information of the smart landmark is obtained. An applicable module for obtaining registered detailed positioning information, such as the query processing engine 408 in FIG. 4, causes an applicable interface, such as the service server communication interface 412 in FIG. 4, to retrieve the registered detailed positioning information from an applicable repository, such as the smart landmark location repository 414 in FIG. 4. In a specific implementation, the detailed positioning information of the smart landmark is obtained from the smart landmark record of the smart landmark.

In step 708 of FIG. 7, a query response is generated using the obtained detailed positioning information of the smart landmark. An applicable module for generating a query response, such as the query processing engine 408 in FIG. 4, generate the query response to the query using the obtained detailed positioning information of the smart landmark.

In step 710 of FIG. 7, the generated query response is transmitted to the vehicle onboard system from which the query was received. An applicable module for transmitting a query response, such as the service server communication interface 412 in FIG. 4, is caused to transmit the generated query response to the vehicle onboard system from which the query was received. In some embodiments, the server may store one or more maps provided by map providers, such as Google, Baidu, DiDi, etc. The query response may include map information of and/or around the smart landmark provided by one or more of the map providers.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 8:
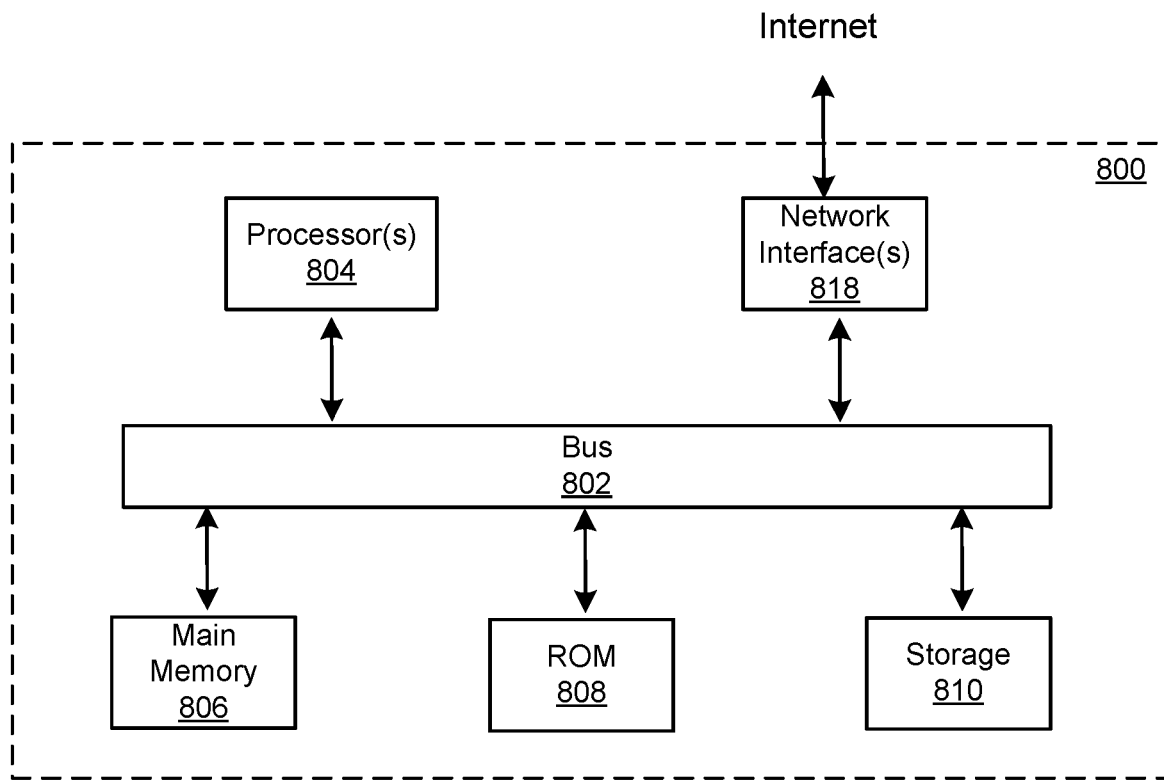
FIG. 8 illustrates a block diagram of an example computer system in which any of the embodiments described herein may be implemented.

FIG. 8 is a block diagram that illustrates a computer system 800 upon which any of the embodiments described herein may be implemented. Specifically, the system 800 enables the functional components of the smart landmark registration server 106, the smart landmark location repository 108, the vehicle onboard system(s) 110, and/or the location service server 112 depicted in FIG. 1 to function as described above. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions. The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The main memory 806, the ROM 808, and/or the storage 810 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A non-transitory computer-readable storage medium storing instructions, when executed by one or more processors, cause the one or more processors to perform operations comprising:

receiving sensor data of a landmark object collected by one or more sensors installed on a vehicle;

obtaining on-site landmark information of the landmark object by parsing the sensor data of the landmark object, wherein the on-site landmark information comprises a landmark ID and a location of the landmark object;

generating a query request based on the on-site landmark information of the landmark object and sending the query request to a server over a wireless network;

receiving, from the server over the wireless network, a ground truth of the landmark object corresponding to the landmark ID and the location of the landmark object, the ground truth including a registered location of the landmark object;

determining whether at least part of information in the ground truth matches at least part of the on-site landmark information of the landmark object; and in response to determining that the at least part of information in the ground truth matches the at least part of the on-site landmark information of the landmark object, operating the vehicle based on the registered location of the landmark object in the ground truth, wherein the operating the vehicle comprises calibrating a location of the vehicle in a satellite-based navigation system of the vehicle by:

determining a global positioning system (GPS) location of the landmark object based on a current location of the vehicle using a GPS of the vehicle and a relative position of the vehicle to the landmark object;

determining a location difference between the GPS location of the landmark object and the registered location of the landmark object in the ground truth; and calibrating the GPS of the vehicle based on the determined location difference.

2. The non-transitory computer-readable storage medium of claim 1, wherein the operations further comprise:
sending a cryptographic key unique to the vehicle with the query request to the server over the wireless network.

3. The non-transitory computer-readable storage medium of claim 1, wherein the location of the landmark object is encrypted using a private cryptographic key unique to the landmark object.

4. The non-transitory computer-readable storage medium of claim 1, wherein the ground truth further comprises a decrypted location of the landmark object decrypted using a public cryptographic key unique to the landmark object.

5. The non-transitory computer-readable storage medium of claim 1, wherein the operations further comprise:
in response to determining that the information in the ground truth mismatches the on-site landmark information of the landmark object, triggering maintenance and/or survey of the landmark object by generating and sending an error feedback to a location service server.

6. The non-transitory computer-readable storage medium of claim 1, wherein operating the vehicle comprises:
generating a high-definition map of an area around the vehicle based on the ground truth of the landmark object.

7. A computer-implemented method, comprising:
receiving sensor data of a landmark object collected by one or more sensors installed on a vehicle;
obtaining on-site landmark information of the landmark object by parsing the sensor data of the landmark object, wherein the on-site landmark information comprises a landmark ID and a location of the landmark object;
generating a query request based on the on-site landmark information of the landmark object and sending the query request to a server over a wireless network;
receiving, from the server over the wireless network, a ground truth of the landmark object corresponding to the landmark ID and the location of the landmark object, the ground truth including a registered location of the landmark object;
determining whether at least part of information in the ground truth matches at least part of the on-site landmark information of the landmark object; and
in response to determining that the at least part of information in the ground truth matches the at least part of the on-site landmark information of the landmark object, operating the vehicle based on the registered location of the landmark object in the ground truth, wherein the operating the vehicle comprises calibrating a location of the vehicle in a satellite-based navigation system of the vehicle by:
determining a global positioning system (GPS) location of the landmark object based on a current location of the vehicle using a GPS of the vehicle and a relative position of the vehicle to the landmark object;
determining a location difference between the GPS location of the landmark object and the registered location of the landmark object in the ground truth; and
calibrating the GPS of the vehicle based on the determined location difference.

8. The method of claim 7, wherein the operating the vehicle based on the registered location of the landmark object in the ground truth comprises:
moving the vehicle to a location determined based on the registered location of the landmark object in the ground truth.

9. The method of claim 7, wherein the location of the landmark object is encrypted using a private cryptographic key unique to the landmark object.

10. The method of claim 7, wherein the ground truth further comprises a decrypted location of the landmark object decrypted using a public cryptographic key unique to the landmark object.

11. The method of claim 7, further comprising:
in response to determining that the information in the ground truth mismatches the on-site landmark information of the landmark object, triggering maintenance and/or survey of the landmark object by generating and sending an error feedback to a location service server.

12. The method of claim 7, wherein operating the vehicle comprises generating a high-definition map of an area around the vehicle based on the ground truth of the landmark object.

13. The method of claim 7, wherein the one or more sensors include an image sensor, and the on-site landmark information is obtained from an image of a code symbol on the landmark object, the image being captured by the image sensor.

14. A system comprising one or more processors and one or more non-transitory computer-readable memories coupled to the one or more processors, the one or more non-transitory computer-readable memories storing instructions that, when executed by the one or more processors, cause the system to perform operations comprising:
receiving sensor data of a landmark object collected by one or more sensors installed on a vehicle;
obtaining on-site landmark information of the landmark object by parsing the sensor data of the landmark object, wherein the on-site landmark information comprises a landmark ID and a location of the landmark object;
generating a query request based on the on-site landmark information of the landmark object and sending the query request to a server over a wireless network;
receiving, from the server over the wireless network, a ground truth of the landmark object corresponding to the landmark ID and the location of the landmark object, the ground truth including a registered location of the landmark object;
determining whether at least part of information in the ground truth matches at least part of the on-site landmark information of the landmark object; and
in response to determining that the at least part of information in the ground truth matches the at least part of the on-site landmark information of the landmark object, operating the vehicle based on the registered location of the landmark object in the ground truth, wherein the operating the vehicle comprises calibrating a location of the vehicle in a satellite-based navigation system of the vehicle by:
determining a global positioning system (GPS) location of the landmark object based on a current location of the vehicle using a GPS of the vehicle and a relative position of the vehicle to the landmark object;

determining a location difference between the GPS location of the landmark object and the registered location of the landmark object in the ground truth; and calibrating the GPS of the vehicle based on the determined location difference.

15. The system of claim 14, wherein the operations further comprise:

sending a cryptographic key unique to the vehicle with the query request to the server over the wireless network.

16. The system of claim 14, wherein the ground truth further comprises a decrypted location of the landmark object decrypted using a public cryptographic key unique to the landmark object.

* * * * *